United States Patent
Chen et al.

(10) Patent No.: US 9,198,256 B2
(45) Date of Patent: Nov. 24, 2015

(54) METHOD AND APPARATUS TO LIMIT CURRENT OVERSHOOT AND UNDERSHOOT IN LIGHT DRIVER

(75) Inventors: Yimin Chen, Palatine, IL (US);
Nicholaos Hillas, Willowbrook, IL (US);
Ajay Tripathi, Libertyville, IL (US);
Kaustuva Acharya, Bartlett, IL (US);
Raman Nair Harish Gopala Pillai, Mt Prospect, IL (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 336 days.

(21) Appl. No.: 13/996,050

(22) PCT Filed: Dec. 20, 2011

(86) PCT No.: PCT/IB2011/055807
§ 371 (c)(1),
(2), (4) Date: Jun. 20, 2013

(87) PCT Pub. No.: WO2012/085836
PCT Pub. Date: Jun. 28, 2012

(65) Prior Publication Data
US 2013/0271040 A1    Oct. 17, 2013

Related U.S. Application Data (60) Provisional application No. 61/425,494, filed on Dec. 21, 2010.

(51) Int. Cl.
*G05F 1/00*    (2006.01)
*H05B 37/02*    (2006.01)
(Continued)

(52) U.S. Cl.
CPC ........ *H05B 33/0887* (2013.01); *H05B 33/0815* (2013.01); *H05B 33/0848* (2013.01)

(58) Field of Classification Search
USPC .................................................. 315/291–311
See application file for complete search history.

(56) References Cited

U.S. PATENT DOCUMENTS 5,933,340 A * 8/1999 Adamson .................... 363/97
6,094,017 A * 7/2000 Adamson .................... 315/307
(Continued)

FOREIGN PATENT DOCUMENTS

EP        2257129 A1    12/2010
WO    2010097752 A1    9/2010

OTHER PUBLICATIONS

PLC810PG, HIPERPLC Family, Power Integrations, Aug. 2009 www.powerint.com.

*Primary Examiner* — Brandon S Cole
(74) *Attorney, Agent, or Firm* — Yuliya Mathis (57) ABSTRACT

A light driver having a primary side driver configured to convert an input from a mains power supply to a primary side output, and a secondary side driver coupled to the primary side driver and configured to rectify and filter the primary side output to provide a driver output current for driving a light load. A microcontroller controls the light driver at start-up so that the secondary side driver is powered-on and the primary side driver is in a non-powered state during a soft-start period, and subsequent to the soft-start period the secondary side driver is set to be in a low output state when powered-on and thereafter set to a state so that driver output current of the secondary side driver increases the light output from the light load from an initial dim level to a nominal dim level without flicker.

21 Claims, 7 Drawing Sheets

(51) Int. Cl.
*H05B 39/04* (2006.01)
*H05B 33/08* (2006.01)

(56) References Cited

U.S. PATENT DOCUMENTS

| | | | |
|---|---|---|---|
| 6,181,066 B1 * | 1/2001 | Adamson | 315/282 |
| 7,723,972 B1 | 5/2010 | Balogh | |
| 2004/0155606 A1 * | 8/2004 | Lin | 315/291 |
| 2008/0231211 A1 * | 9/2008 | Baarman et al. | 315/294 |
| 2009/0237007 A1 | 9/2009 | Leng | |
| 2009/0251934 A1 | 10/2009 | Shteynberg et al. | |
| 2010/0225249 A1 | 9/2010 | Liao et al. | |
| 2012/0146530 A1 * | 6/2012 | Han et al. | 315/219 |

* cited by examiner

METHOD AND APPARATUS TO LIMIT CURRENT OVERSHOOT AND UNDERSHOOT IN LIGHT DRIVER

TECHNICAL FIELD

The present invention is directed generally to drivers for lighting devices. More particularly, various inventive methods and apparatus disclosed herein relate to limiting current overshoot and current undershoot in a light driver during turn-on, turn-off, or during brown-out conditions.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Under various conditions, such as start up, mains brownout, or turn off, output current in a LED driver can overshoot resulting in flicker or flash from the LED(s) and potential LED failure due to excessive current. This can be due to lack of control over the timing of the power supplies (for the power stage integrated circuits (ICs)) and reference ICs, and can also be due to initial conditions of regulator ICs, etc., of the LED driver. In traditional LED drivers, the current reference value is either a fixed value or merely controlled by a dimming interface. At start up, the output current of the driver is zero. Because of the large error between the driver output current and the current reference signal, a large feedback signal is provided. When the driver suddenly reacts to such a very large feedback signal, the output current of the driver rises at a rapid rate. This may lead to overshoot of the driver output current, causing the LED light output to flash and flicker. Also, depending on the initial condition of the inputs of regulator ICs, driver can start with high output current.

Thus, there is a need in the art to control the power supplies of the various power stage ICs, and to control reference values and/or initial conditions of the feedback control circuits of the LED driver.

SUMMARY

The present disclosure is directed to inventive methods and apparatus for limiting current overshoot and current undershoot in a light driver.

Generally, in one aspect, the light driver includes a primary side driver configured to convert an input from a mains power supply to a primary side output; a secondary side driver coupled to the primary side driver and configured to rectify and filter the primary side output to provide a driver output current for driving a light load; and a microcontroller configured to control the light driver so that the secondary side driver is powered-on and the primary side driver is in a non-powered state during a soft-start period, and subsequent to the soft-start period the secondary side driver is set to be in a low output state when powered-on and thereafter set to a state so that driver output current of the secondary side driver increases the light output from the light load from an initial dim level to a nominal dim level without flicker.

In another aspect, the light driver includes a primary side driver configured to convert an input from a mains power supply to a primary side output; a secondary side driver coupled to the primary side driver and configured to rectify and filter the primary side output to provide a driver output current for driving a light load, the secondary side driver providing a feedback signal to the primary side driver responsive to a soft-start signal and a current reference signal; and a microcontroller configured to provide the soft-start signal and the current reference signal responsive to an input dimming signal indicative of a desired dim level of the light load, the primary side driver is configured to be off when the soft-start signal is turned on, and after the soft-start signal is turned off to be set responsive to the feedback signal to a low output state and thereafter to an initial state based on the current reference signal.

In yet another aspect, the light driver includes a primary side driver configured to convert an input from a mains power supply to a primary side output; a secondary side driver coupled to the primary side driver and configured to rectify and filter the primary side output current to provide a driver output current for driving a light load, the secondary side driver providing a feedback signal to the primary side driver responsive to a soft-start signal and a current reference signal; a primary side driver power supply configured to provide a first operating voltage to the primary side driver; and a secondary side driver power supply configured to provide a second operating voltage to the secondary side driver, the secondary side driver power supply including a microcontroller configured to provide the soft-start signal and the current reference signal to the secondary side driver, the primary side driver is configured to be cut-off from the second operating voltage when the soft-start signal is turned on, and after the soft-start signal is turned off to be set responsive to the feedback signal to a low output state and thereafter to an initial state based on the current reference signal.

In a still further aspect, a method eliminating flicker from a light source is provided which includes converting an input from a mains power supply to a primary side output in a primary side driver stage; rectifying and filtering the primary side output to provide a driver output current for driving the light source; and providing control so that the secondary side driver stage is powered-on and the primary side driver stage is in a non-powered state during a soft-start period, and subsequent to the soft-start period the secondary side driver stage is set to be in a low output state when powered-on and thereafter set to a state so that driver output current of the secondary side driver stage increases the light output from the light source from an initial dim level to a nominal dim level without flicker.

In another aspect, the light driver includes a primary side driver configured to convert an input from a mains power supply to a primary side output; a secondary side driver coupled to the primary side driver and configured to rectify and filter the primary side output current to provide a driver output current for driving a light load, the secondary side driver providing a feedback signal to the primary side driver responsive to a soft-start signal; a primary side driver power supply configured to provide a first operating voltage to the primary side driver; and a secondary side driver power supply configured to provide a second operating voltage to the secondary side driver, the secondary side driver power supply including a microcontroller configured to provide the soft-start signal to the secondary side driver, wherein during turning off of the light driver, the primary side driver is configured to be cut-off from the second operating voltage and the feedback signal is set to a low output state responsive to the soft-start signal.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
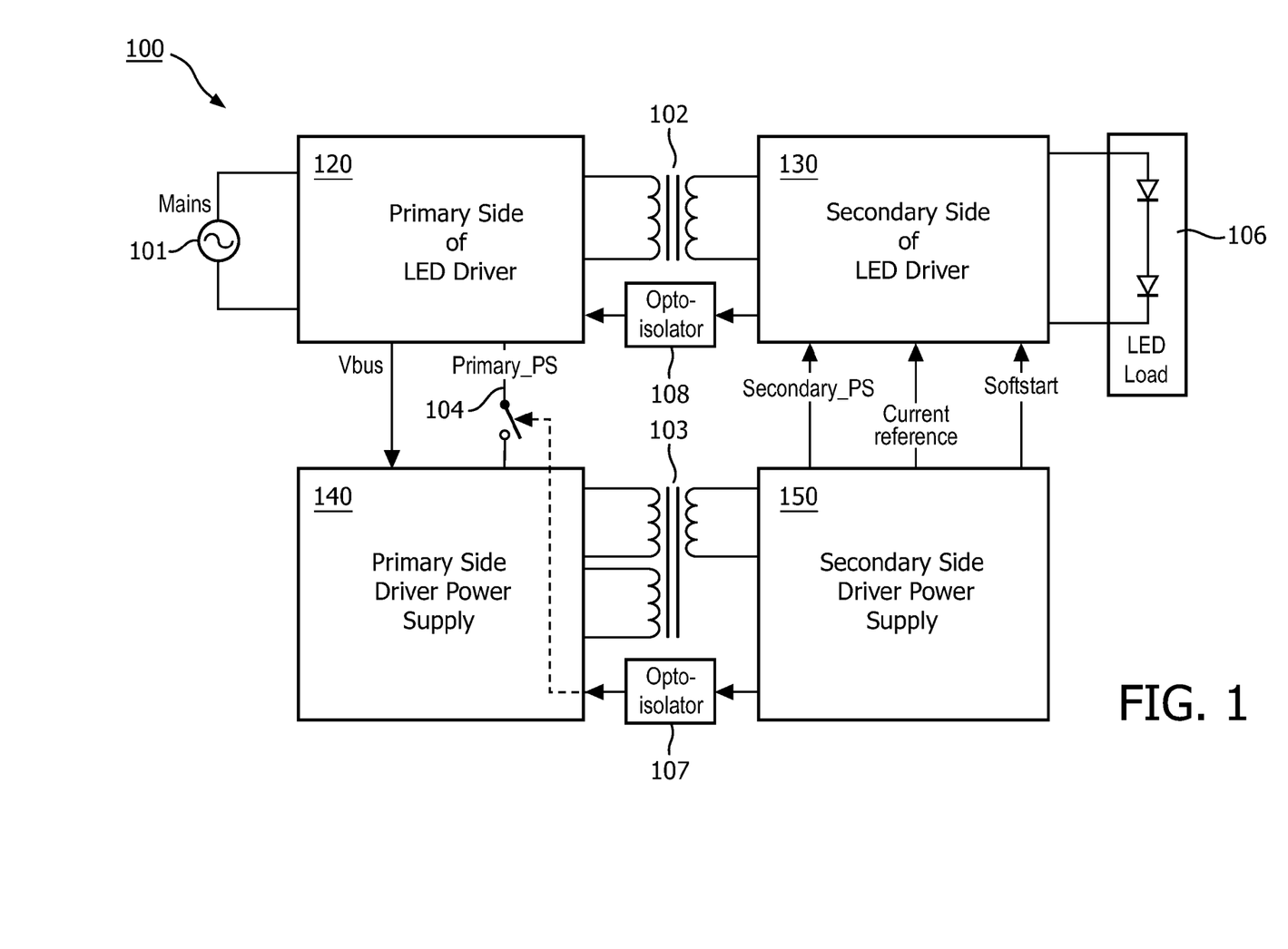
FIG. 1 illustrates a block diagram of the LED driver in accordance with a representative embodiment.

Referring to FIG. 1, in one embodiment, a block diagram of the LED driver 100 is depicted. The mains input voltage (mains) 101 is connected to the primary side 120 of LED driver 100. The primary side 120 of the LED driver 100 is coupled to the primary side of isolation transformer 102. The secondary side of isolation transformer 102 is coupled to the secondary side 130 of LED driver 100. A primary side driver power supply 140 is connected to primary side 120, and provides a regulated voltage primary_PS (power supply) to integrated circuits (ICs) and other peripheral circuits of the primary side 120 via switch 104. Primary side driver power supply 140 is connected to bus voltage $V_{bus}$ within primary side 120, as will be subsequently described. Primary side driver power supply 140 is also connected to a primary side of isolation transformer 103. Secondary side driver power supply 150 is connected to the secondary side of isolation transformer 103. Secondary side driver power supply 150 provides a regulated voltage secondary_PS (power supply). The secondary side driver power supply 150 also provides power to a microprocessor (shown in FIG. 2) and its peripheral circuits. The microprocessor provides a current reference signal and a soft-start signal to ICs and other peripheral circuits of secondary side 130. A switch control signal is optically coupled from the microprocessor to the primary side of LED driver 100 via opto-isolator 107 to selectively disable switch 104, to thus disable operating voltage provided to primary side 120 from primary side driver power supply 140. A feedback signal is provided from secondary side 130 to primary side 120 via opto-isolator 108. Also, the output of secondary side 130 is provided to drive light load 106, which may include one or more LEDs or which may be an LED module including a plurality of LEDs connected together serially for example.

Figure 2:
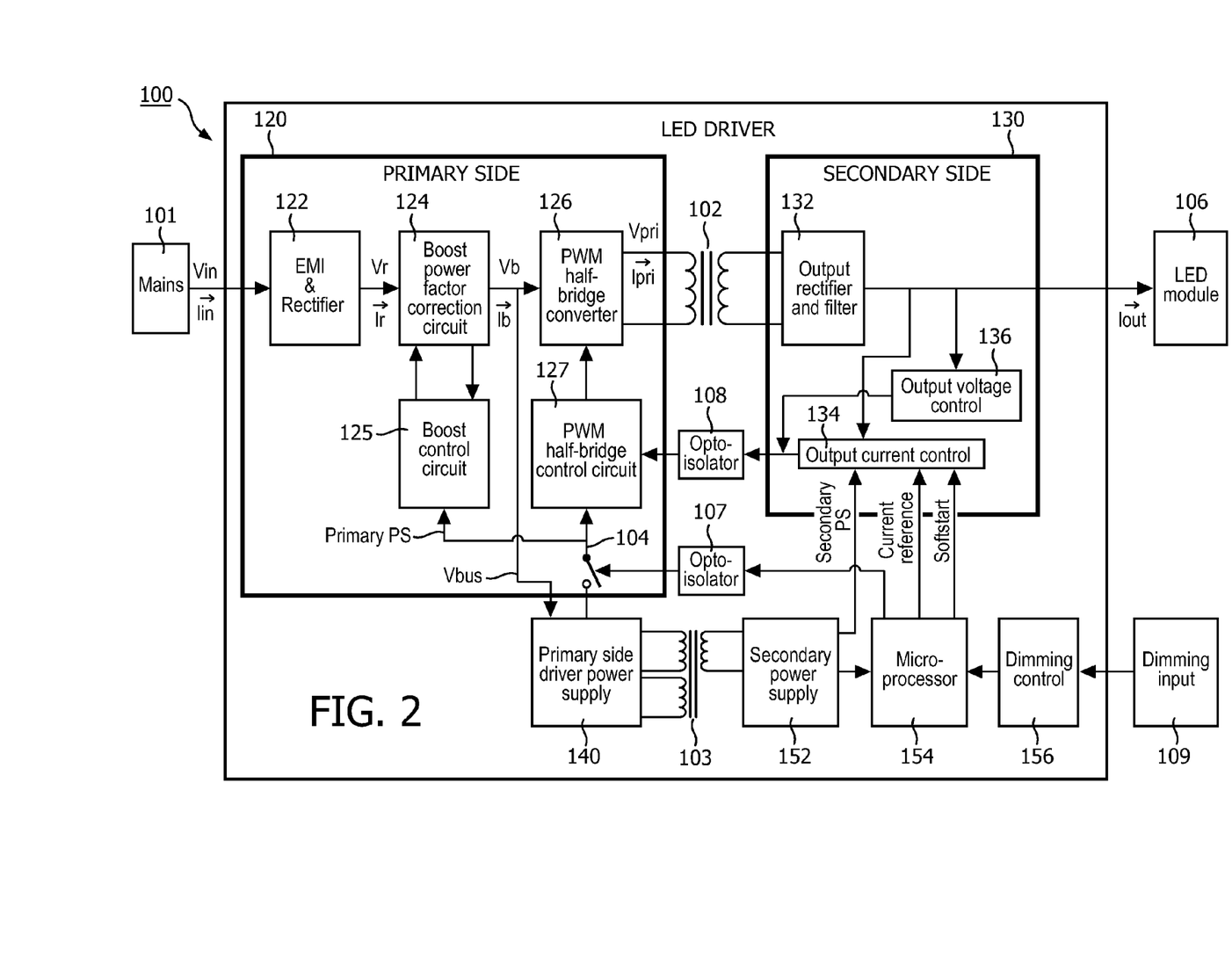
FIG. 2 illustrates a block diagram of the LED driver in accordance with a more detailed representative embodiment.
Figure 3:
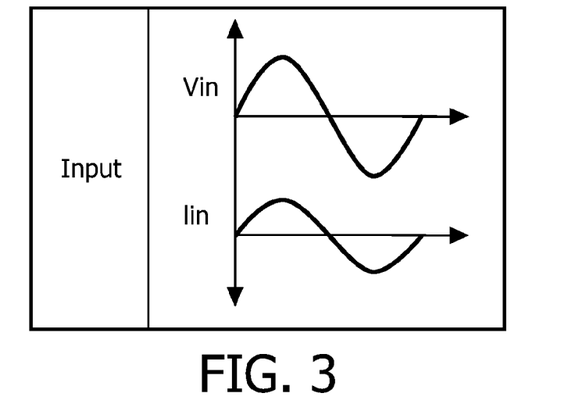
FIG. 3 illustrates the input from the mains to the LED driver of FIG. 2.
Figure 4:
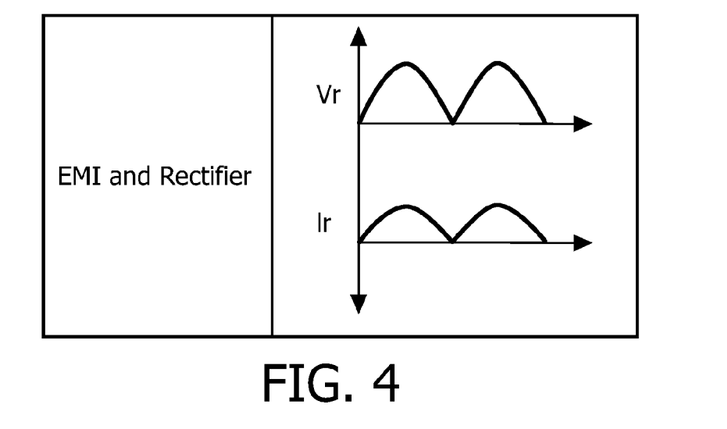
FIG. 4 illustrates the output of the EMI filter and rectifier circuit of the LED driver shown in FIG. 3
Figure 5:
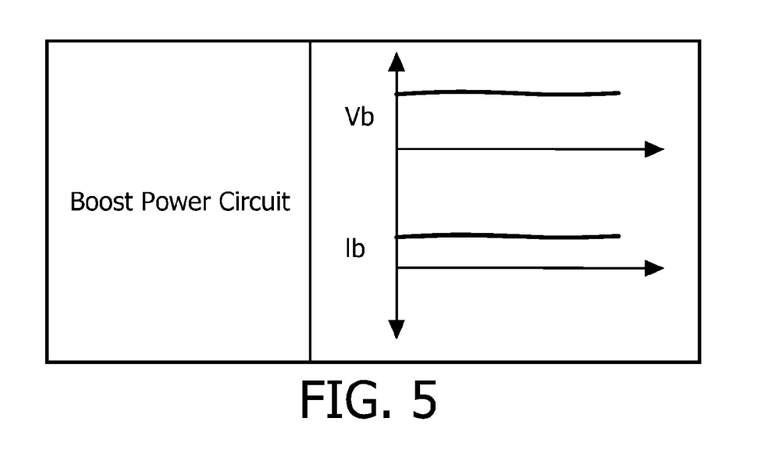
FIG. 5 illustrates the output of the Boost PFC circuit of the LED driver shown in FIG. 2.

Referring to FIG. 2, a more detailed embodiment of LED driver 100 is depicted. Mains 101 provides an AC sinusoidal input such as depicted in FIG. 3 to the input electromagnetic interference (EMI) filter and rectifier circuit 122 within primary side 120 of LED driver 100. The input is depicted in FIG. 3 as having a voltage Vin and a corresponding current Iin. EMI filter and rectifier circuit 122 may consist of a network of capacitors and inductors, or like circuits, that limit high-frequency components injected into the input to provide a limited input. The rectifier stage of the EMI filter and rectifier circuit 122 converts the limited input into a rectified sinusoidal waveform as depicted in FIG. 4. The output of the EMI filter and rectifier circuit 122 is provided to boost power factor correction (PFC) circuit 124. Boost PFC circuit 124 converts the rectified sinusoidal waveform provided from the EMI filter and rectifier circuit 122 into a fixed, regulated DC voltage such as depicted in FIG. 5. Boost PFC circuit 124 ensures that the current Ir drawn from the rectifier stage of the EMI filter and rectifier circuit 122 is in phase with the voltage Vr, to consequently ensure that LED driver 100 operates close to unity power factor. Boost control circuit 125 controls semiconductor switches within boost PFC circuit 124 to provide these above noted functions. Boost control circuit 125 may consist of one or more ICs and their peripheral passive components, which sense the output bus voltage, the voltage at the output of the rectifier, and the current flowing in boost PFC circuit 124, and which controls the semiconductor switches within boost PFC circuit 124 such that the bus voltage is regulated to a certain pre-defined desired level and the current Ir is in phase with the voltage Vr.

Figure 6:
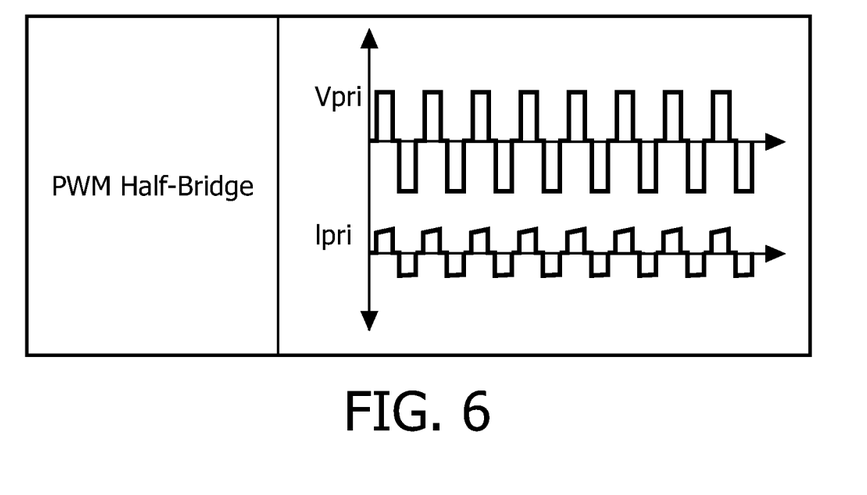
FIG. 6 illustrates the output of the PWM half-bridge converter of the LED driver shown in FIG. 2.

Pulse width modulation (PWM) half-bridge converter 126 converts the regulated DC voltage provided as output from boost PFC circuit 124 to a high-frequency pulsating signal such as depicted in FIG. 6. The high-frequency pulsating signal is depicted as having voltage Vpri and corresponding current Ipri. The width of the pulses is set by a primary side control signal output from PWM half-bridge control circuit (half-bridge controller) 127 responsive to a feedback signal provided from output current control circuit 134 within secondary side 130 via opto-isolator 108. The primary side control signal output from PWM half-bridge control circuit 127 controls the on/off time of the switches in PWM half-bridge converter 126. The PWM half-bridge converter 126 may consist of two switches. The duration during which the switches are turned on (or off) determines the pulse width of the high-frequency pulsating signal shown in FIG. 6. The turn on (or off) of the switches are controlled by the PWM half-bridge control circuit 127, which may also be implemented using ICs, based on the feedback from the secondary side via the opto-isolator 108. Opto-isolator 108 provides electrical isolation between the primary and the secondary sides, and substantially prevents high voltages or rapidly changing voltage on secondary side 130 from damaging components or distorting transmissions. The high-frequency pulsating signal from PWM half-bridge converter 126 is connected to the primary side of isolation transformer 102. Switch 104 is depicted in FIG. 2 as incorporated within primary side 120, but may equally well be disposed outside primary side 120 in the manner shown in FIG. 1.

Figure 7:
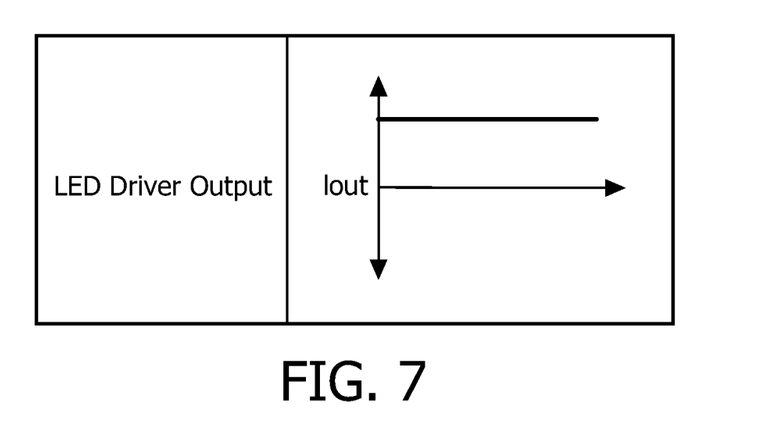
FIG. 7 illustrates the LED driver output from the output rectifier and filter circuit of the LED driver shown in FIG. 2.

The secondary side of isolation transformer 102 as depicted in FIG. 2 is connected to output rectifier and filter circuit 132, which rectifies and filters the signal provided from the secondary side of the isolation transformer 102 to output a DC driving current such as depicted in FIG. 7. This DC driving current is provided as an LED driver output current to light load 106. The driving current is also provided as a feedback signal to output current control circuit 134 (which will be subsequently described in greater detail). The output voltage is provided as feedback to the output voltage control circuit 136. The outputs of output current control circuit 134 and output voltage control circuit 136 are connected together to provide the feedback signal to primary side 120 via opto-isolator 108. Output voltage control circuit 136 is a control that limits the maximum voltage provided to light load 106.

Primary side driver power supply 140 as depicted in FIG. 2 is coupled to the fixed, regulated DC voltage output from boost PFC circuit 124 via the $V_{bus}$. Primary side driver power supply 140 may be a flyback converter for instance with two isolated outputs. A first of the isolated outputs is provided as a voltage primary_PS to boost control circuit 125, PWM half-bridge control circuit 127 and various other ICs within primary side 120, via switch 104. A second of the isolated outputs of primary side driver power supply 140 is connected to an additional primary side winding of isolation transformer 103.

LED driver 100 as depicted in FIG. 2 further includes secondary power supply 152, microprocessor 154 and dimming control circuit 156. Microcontroller 154 may be one of a variety of processing devices, such as a processor, microprocessor, or central processing unit (CPU), application specific integrated circuits (ASICs), field-programmable gate arrays (FPGAs), or combinations thereof, using software, firmware, hard-wired logic circuits, or combinations thereof. Secondary power supply 152 is connected to the secondary side of isolation transformer 103 and provides a regulated voltage secondary_PS to output current control circuit 134 and various other ICs in secondary side 130. Secondary power supply 152 also provides a regulated voltage to microprocessor 154. Dimming control circuit 156 is an interface for the Dim signal and is disposed between dimming input 109 and microprocessor 154. Dimming input 109 provides a Dim signal indicative of a nominal Dim level voltage desired for Light load 106. Based on the Dim signal, microprocessor 154 adjusts the current reference signal provided as output therefrom to output current control circuit 134. Microprocessor 154 also provides the soft-start signal to output current control circuit 134 upon start-up, turn-off, and upon detection of a power disruption of the regulated voltage provided from secondary power supply 152 that may occur due to a brown-out condition. Microprocessor 154 also provides a switch control signal to primary side 120 via opto-isolator 107, to control on/off timing of switch 104. Opto-isolator 107 provides electrical isolation between the primary and secondary sides and to substantially prevent high voltages or rapidly changing voltage on secondary side 130 from damaging components or distorting transmissions.

A memory (not shown) is also included as part of LED driver 100, for storing executable software/firmware and/or executable code for microcontroller 154. The memory (not shown) may be incorporated as part of microcontroller 154, or may be disposed separately. The executable software/firmware and/or executable code enables the determination of a number of signals and voltages used during start up, turn off and brownout (e.g., sensing the bus voltage ($V_{bus}$), and execution of a softstart signal) which will be subsequently described in more detail. The memory may be any number, type and combination of nonvolatile read only memory (ROM) and volatile random access memory (RAM), and may store various types of information, such as computer programs and software algorithms executable by the processor or CPU. The memory may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

Figure 8:
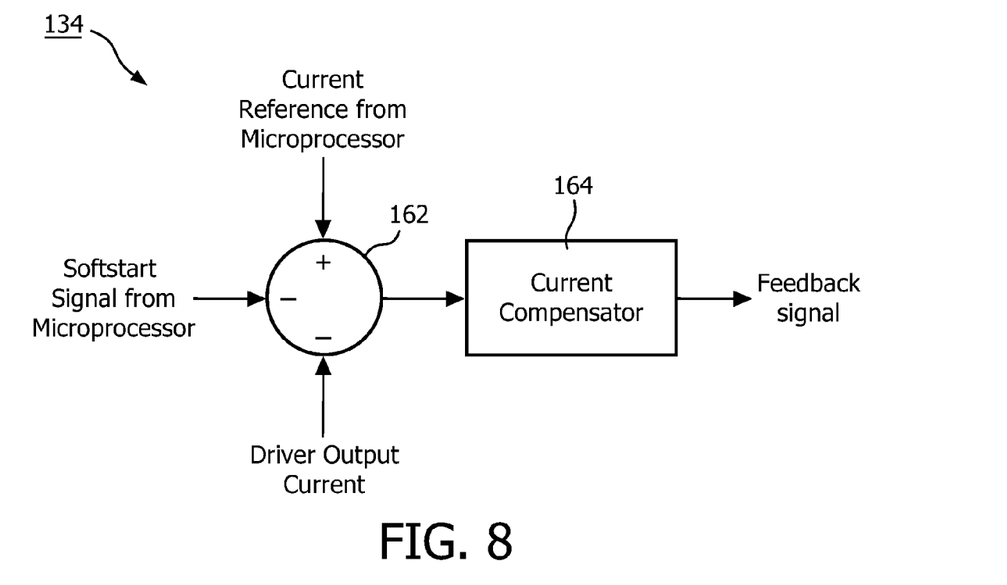
FIG. 8 illustrates a block diagram of the output current control circuit shown in FIG. 2.

Output current control circuit 134 of secondary side 130 is shown in greater detail in FIG. 8, and includes subtractor 162 and current compensator circuit 164. Subtractor 162 is configured to subtract both the soft-start signal provided by microprocessor 154 and the LED driver output current provided by output and rectifier filter circuit 132, from the current reference signal provided by microprocessor 154. The resultant signal output from subtractor 162 is provided to current compensator 164. Current compensator 164 compensates the resultant signal. Current compensator 164 may be configured to adjust the feedback signal provided to the input of the opto-isolator 108 in such a way that the output current of LED driver 100 is as close as possible to the current reference signal received from microprocessor 154. The compensated signal is provided as the feedback signal to primary side 120 via opto-isolator 108.

Operation of LED driver 100 as shown in FIG. 2 will now be described with reference to FIG. 9 which depicts signals during a controlled start-up sequence, and FIG. 10 which depicts a flow chart, in accordance with a representative embodiment.

At the onset of start-up, switch 104 is maintained off so that the regulated voltage primary_PS is not provided to primary side 120. Boost PFC circuit 124, PWM half-bridge converter 126, boost control circuit 125 and PWM half-bridge control circuit 127 are thus non-operational. As such, at start-up, the bus voltage Vbus is substantially the output of the rectifier stage of the EMI filter and rectifier circuit 122, and is directly proportional to the mains voltage. This is because the output of the EMI filter and rectifier circuit 122 is coupled to Vbus through diodes (not shown).

When Vbus reaches a minimum or first threshold value at step S1 in FIG. 10, secondary power supply 152 and microcontroller 154 are subsequently turned on at step S2 in FIG. 10, at time 201 depicted in FIG. 9. Thereafter at Step S3 in FIG. 10, microcontroller 154 checks whether the bus voltage Vbus has increased above a certain critical or second threshold value. When voltage Vbus is above the second threshold value, the soft-start signal is turned on at step S4, at time 202 depicted in FIG. 9. The soft-start signal saturates the current control loop via output current control circuit 134. By saturating the output current control loop, the feedback signal provided to primary side 120 via opto-isolator 108 is pulled low. During the duration when the soft-start signal is on, the current reference signal is maintained low by microprocessor 154. Also at time 202, initial system levels are set.

Figure 9:
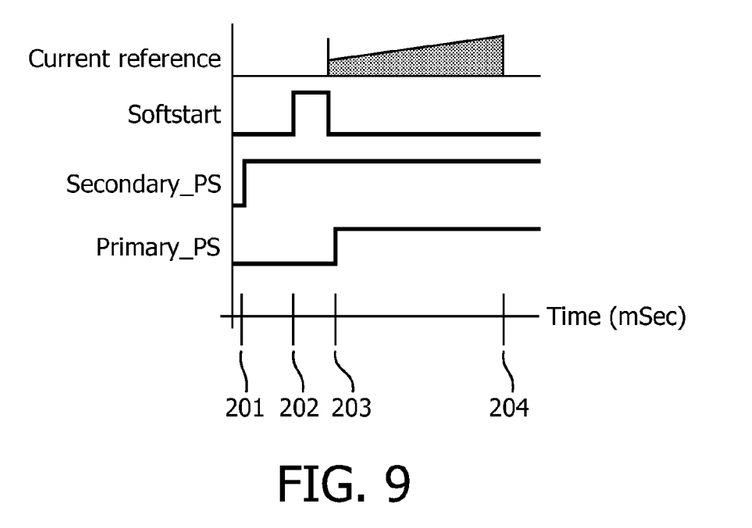
FIG. 9 illustrates signals during a controlled start-up sequence in accordance with a representative embodiment.
Figure 10:
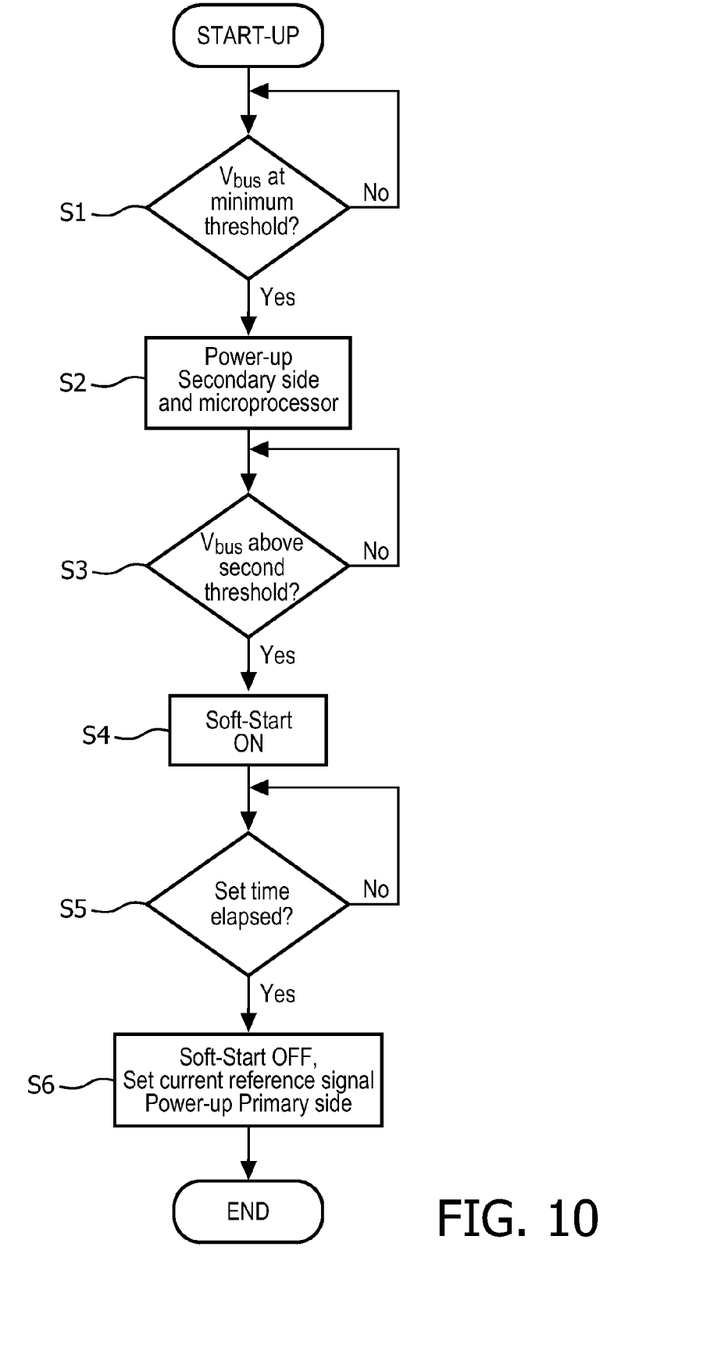
FIG. 10 illustrates a flow chart explaining operation of the controlled start-up sequence in accordance with FIG. 9.

At step S5 in FIG. 10, microcontroller 154 determines if a set time period has elapsed since the soft-start signal was turned on in step S4. When microcontroller 154 determines that the set time period has elapsed, the soft-start signal is turned off at step S6 in FIG. 10, at time 203 depicted in FIG. 9. Also at time 203 depicted in FIG. 9, the current reference signal is set by microcontroller 154 to a Dim initial level, which is about 25% of a nominal Dim level voltage provided by dimming input 109. Still further at time 203, microcontroller 154 provides the switch control signal via opto-isolator 107 to turn on switch 104 and power-up primary side 120. Subsequent to time 203, microprocessor 154 linearly increases the current reference signal as provided to output current control circuit 134 to the nominal Dim level voltage for a duration that ends at time 204. The time duration of the increase can be adjusted by microcontroller 154 depending on the time constants of the circuits. The controlled start-up sequence subsequently ends at time 204 depicted in FIG. 9. It should be understood that any first and second threshold values, and any set time period can be selected by a system designer. Also, the Dim initial level may be at set to other values either below or above 25% of the nominal Dim level voltage. The Dim initial level may in the alternative be set to zero.

Accordingly, in the controlled start-up sequence described with respect to FIGS. 9 and 10, microprocessor 154 provides control so that primary side 120 of LED driver 100 is powered-up after secondary side 130. During the duration when the soft-start signal is on and boost PFC circuit 124, PWM half-bridge converter 126, boost control circuit 125 and PWM half-bridge control circuit 127 are maintained off, the LED driver output current consequently provided to light load 106 from secondary side 130 is zero, so that substantially no light is output from light load 106. The secondary side 130 is thus isolated from mains 101 during a time period in which the bus voltage Vbus at primary side 120 settles to a desired value. When the soft-start signal goes low, the feedback signal in the pulled down state as previously provided from secondary side 130 is present at PWM half-bridge control circuit 127. Consequently, when PWM half-bridge control circuit 127 is initially powered-up, the primary side control signal provided from PWM half-bridge control circuit 127 places PWM half-bridge converter 126 in the low current state so that the LED driver output current provided to light load 106 from secondary side 130 is maintained at zero. After an inherent short delay, the feedback signal responsive to the current reference signal set to the Dim initial level is subsequently provided to PWM half-bridge control circuit 127. At that point, PWM half-bridge converter 126 resumes operation under control of PWM half-bridge control circuit 127 in a state responsive to the current reference signal set to the Dim initial level. Thereafter, PWM half-bridge converter 126 operates responsive to the feedback signal based on the current reference signal which linearly increases to the nominal Dim level voltage. Because bus voltage Vbus at primary side 120 is permitted to settle to a desired value, and because PWM half-bridge converter 126 resumes operation responsive to the linearly increasing feedback signal when powered-up, overshoot and undershoot of the LED driver output current is prevented. The controlled start-up sequence ensures that LED driver 100 does not experience any sudden increase in load. As a result, substantially no flicker is observed in the light output from light load 106 at start-up.

Operation of LED driver 100 will now be described with reference to FIG. 11, which depicts signals during a controlled sequence responsive to brownout. A sequence of events somewhat similar as described with respect to FIGS. 9 and 10 is carried out in the controlled sequence shown in FIG. 11. In this embodiment, because microcontroller 154 remains on throughout the sequence, the regulated voltage secondary_PS is not indicated in FIG. 11. The brownout condition is characterized by a sudden drop in voltage provided from mains 101, resulting in a drop of bus voltage Vbus at primary side 120. Responsive to this drop of bus voltage Vbus, the light output of light load 106 falls. The bus voltage of Vbus is monitored by microcontroller 154 through secondary power supply 152, isolation transformer 103 and primary side driver power supply 140 shown in FIG. 2. The monitored result is shown in FIG. 11 as the mains monitor signal, which is brought to a high state by microcontroller 154 when a drop of bus voltage Vbus is detected.

Figure 11:
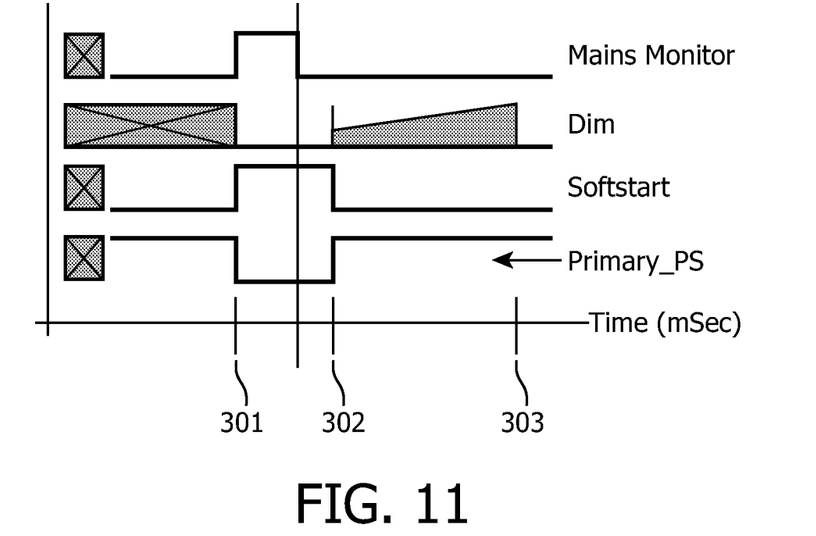
FIG. 11 illustrates a signal sequence during "brownout" conditions in accordance with a representative embodiment.

In the controlled sequence of FIG. 11, microcontroller 154 determines the occurrence of a brownout condition as indicated at time 301. Responsive thereto at time 301, microcontroller 154 provides the switch control signal to primary side 120 via opto-isolator 107 to turn off switch 104, so that regulated voltage primary_PS is not provided to boost PFC circuit 124, PWM half-bridge converter 126, boost control circuit 125 and PWM half-bridge control circuit 127 within primary side 120. Microcontroller 154 also turns the soft-start signal on at time 301. As described with respect to FIG. 9, this saturates the output current control loop within secondary side 130, pulling low the feedback signal as provided to primary side 120 via opto-isolator 108, so that the LED driver output current is consequently brought to zero. During the duration when the soft-start signal is on, initial system levels are set, as described previously with respect to FIG. 9. Thereafter, the same sequence of events as described with respect to FIG. 9 follows, whereby the soft-start signal is turned off, microcontroller 154 provides the switch control signal via opto-isolator 107 to turn on switch 104 and power-up primary side 120, and the current reference signal is set to the Dim initial level at time 302 depicted in FIG. 11. Also subsequent to time 302, microcontroller 154 linearly increases the current reference signal as provided to output current control circuit 134 to the nominal Dim level voltage for a duration that ends at time 303. The controlled sequence ends at time 303 depicted in FIG. 11. This controlled sequence subsequent to the brownout condition ensures that LED driver 100 does not experience any sudden increase in load as mains 101 return to normal. As a result, substantially no flicker is observed in the light output from light load 106 when normal operation resumes after the brownout condition, substantially eliminating flicker.

Figure 12:
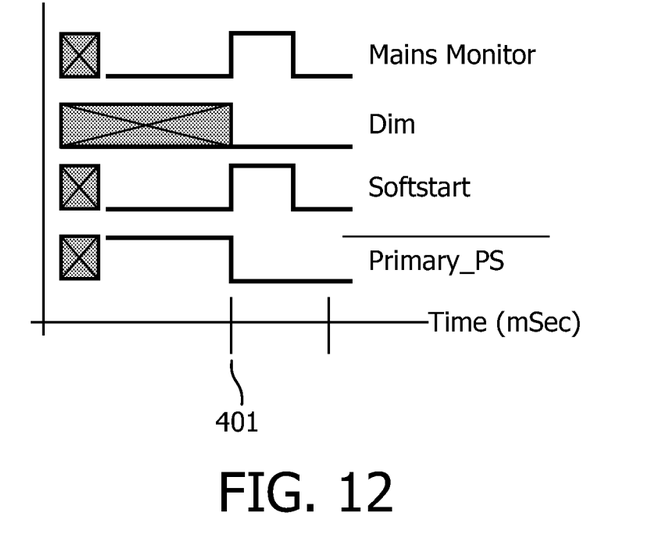
FIG. 12 illustrates a controlled signal sequence for turning off the LED driver in accordance with a representative embodiment.

Operation of LED driver 100 will now be described with reference to FIG. 12, which illustrates a controlled signal sequence for turning off the LED driver. A sequence of events somewhat similar as described with respect to FIGS. 9, 10 and 11 is carried out in the controlled sequence shown in FIG. 12. When the mains power is removed, the voltage Vr and subsequently the bus voltage Vbus shown in FIG. 2 drops gradually to zero. When microprocessor 154 detects that the bus voltage Vbus goes below a certain level, microprocessor 154 pulls the softstart signal high at time 401 in FIG. 12, saturating the output current control loop so that the feedback signal provided to primary side 120 via opto-isolator 108 is pulled low. At the same time, microprocessor 154 provides the switch control signal via opto-isolator 107 to turn off switch 104, so that the Primary_PS signal is pulled low. Since the feedback signal provided to the PWM half-bridge control circuit 127 via opto-isolator 108 from the secondary side output current control loop is pulled low, the driver output current goes to zero. If the softstart signal was not present, the feedback signal provided to the PWM half-bridge control circuit 127 would remain at the steady-state value. In such a case, because the bus voltage Vbus would begin decreasing responsive to the mains voltage going low, the PWM half-bridge converter 126 would operate at the maximum possible duty ratio, thereby causing the output current to increase temporarily before turning off. This would cause the LED light output to flash for a small duration of time. Such a flash is prevented in this controlled signal sequence using the soft-start signal.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

Any reference numerals or other characters, appearing between parentheses in the claims, are provided merely for convenience and are not intended to limit the claims in any way.

What is claimed is:

1. A light driver, comprising:
    a primary side driver configured to convert an input from a mains power supply to a primary side output;
    a secondary side driver coupled to the primary side driver and configured to rectify and filter the primary side output to provide a driver output current for driving a light load; and
    a microcontroller configured to control the light driver so that the secondary side driver is powered-on and the primary side driver is in a non-powered state during a soft-start period, and subsequent to the soft-start period the primary side driver is set to be in a low output state when powered-on and thereafter set to a state so that driver output current of the secondary side driver increases the light output from the light load from an initial dim level to a nominal dim level without flicker.

2. The light driver of claim 1, wherein the initial dim level is set to about 25% of the nominal dim level.

3. The light driver of claim 1, wherein the secondary side driver provides a feedback signal to set the states of the primary side driver responsive to a soft-start signal and a current reference signal provided by the microcontroller.

4. The light driver of claim 3, wherein the feedback signal is optically coupled from the primary side driver to the secondary side driver.

5. A light driver, comprising:
    a primary side driver configured to convert an input from a mains power supply to a primary side output;
    a secondary side driver coupled to the primary side driver and configured to rectify and filter the primary side output to provide a driver output current for driving a light load, the secondary side driver providing a feedback signal to the primary side driver responsive to a soft-start signal and a current reference signal; and
    a microcontroller configured to provide the soft-start signal and the current reference signal responsive to an input dimming signal indicative of a desired dim level of the light load,
    the primary side driver is configured to be off when the soft-start signal is turned on, and after the soft-start signal is turned off to be set responsive to the feedback signal to a low output state and thereafter to an initial state based on the current reference signal.

6. The light driver of claim 5, wherein the current reference signal is set by the microprocessor to an initial dim level and thereafter increases to a nominal dim level.

7. The light driver of claim 6, wherein the initial dim level is set to about 25% of the nominal dim level.

8. The light driver of claim 5, wherein the feedback signal is optically coupled from the primary side driver to the secondary side driver.

9. The light driver of claim 5, wherein the light load comprises an LED module.

10. A light driver, comprising:
    a primary side driver configured to convert an input from a mains power supply to a primary side output;
    a secondary side driver coupled to the primary side driver and configured to rectify and filter the primary side output current to provide a driver output current for driving a light load, the secondary side driver providing a feedback signal to the primary side driver responsive to a soft-start signal and a current reference signal;
    a primary side driver power supply configured to provide a first operating voltage to the primary side driver; and
    a secondary side driver power supply configured to provide a second operating voltage to the secondary side driver, the secondary side driver power supply including a microcontroller configured to provide the soft-start signal and the current reference signal to the secondary side driver,
    the primary side driver is configured to be cut-off from the second operating voltage when the soft-start signal is turned on, and after the soft-start signal is turned off to be set responsive to the feedback signal to a low output state and thereafter to an initial state based on the current reference signal.

11. The light driver of claim 10, wherein the current reference signal is set by the microprocessor to an initial dim level and thereafter increases to a nominal dim level.

12. The light driver of claim 11, wherein the initial dim level is set to about 25% of the nominal dim level.

13. The light driver of claim 10, wherein the secondary side driver comprises an output control circuit including a subtractor configured to subtract the soft-start signal and the driver output current from the current reference signal to provide the feedback signal.

14. The light driver of claim 10, wherein the primary side driver comprises:
   a rectifier configured to limit high frequency components of the input from the mains power supply and rectify the limited input, to provide a rectified waveform;
   a boost power factor correction circuit configured to convert the rectified waveform to a fixed voltage;
   a half-bridge controller configured to provide a primary side control signal responsive to the feedback signal; and
   a half-bridge converter configured to convert the rectified waveform responsive to the primary side control signal, to provide a pulsating signal as the primary side output.

15. The light driver of claim 10, wherein the feedback signal is optically coupled from the primary side driver to the secondary side driver.

16. The light driver of claim 10, wherein the primary side driver comprises a switch configured to selectively disable the operating voltage provided from the primary side driver power supply responsive to a switch control signal provided from the microprocessor.

17. The light driver of claim 16, wherein the switch control signal is optically coupled from the microprocessor to the switch.

18. The light driver of claim 10, wherein the light load comprises an LED module.

19. A method of eliminating flicker from a light source, the method comprising:
   converting an input from a mains power supply to a primary side output in a primary side driver stage;
   rectifying and filtering the primary side output to provide a driver output current for driving the light source; and
   providing control so that the secondary side driver stage is powered-on and the primary side driver stage is in a non-powered state during a soft-start period, and subsequent to the soft-start period the primary side driver stage is set to be in a low output state when powered-on and thereafter set to a state so that driver output current of the secondary side driver stage increases the light output from the light source from an initial dim level to a nominal dim level without flicker.

20. The method of claim 19, wherein the initial dim level is set to about 25% of the nominal dim level.

21. A light driver, comprising:
   a primary side driver configured to convert an input from a mains power supply to a primary side output;
   a secondary side driver coupled to the primary side driver and configured to rectify and filter the primary side output current to provide a driver output current for driving a light load, the secondary side driver providing a feedback signal to the primary side driver responsive to a soft-start signal;
   a primary side driver power supply configured to provide a first operating voltage to the primary side driver; and
   a secondary side driver power supply configured to provide a second operating voltage to the secondary side driver, the secondary side driver power supply including a microcontroller configured to provide the soft-start signal to the secondary side driver,
   during turning off of the light driver, the primary side driver is configured to be cut-off from the first operating voltage and the feedback signal is set to a low output state responsive to the soft-start signal.

* * * * *